(12) United States Patent
Pantone et al.

(10) Patent No.: US 6,503,980 B2
(45) Date of Patent: *Jan. 7, 2003

(54) LIQUID POLYURETHANE PLASTICIZERS CONTAINING ALLOPHANATE AND/OR CARBODIIMIDE AND/OR URETONIMINE GROUPS

(75) Inventors: Richard S. Pantone, New Martinsville, WV (US); Peter H. Markusch, McMurray, PA (US)

(73) Assignee: Bayer Corporation, Pittsburgh, PA (US)

( * ) Notice: Subject to any disclaimer, the term of this patent is extended or adjusted under 35 U.S.C. 154(b) by 90 days.

This patent is subject to a terminal disclaimer.

(21) Appl. No.: 09/745,060

(22) Filed: Dec. 20, 2000

(65) Prior Publication Data

US 2002/0132915 A1 Sep. 19, 2002

(51) Int. Cl.$^7$ .............................. C08J 3/00; C08K 3/20; C08L 75/00; C08G 18/32; C08G 18/38
(52) U.S. Cl. ..................... 524/589; 524/198; 524/590; 528/44; 528/60; 528/65; 528/85
(58) Field of Search ................................ 524/198, 589, 524/590; 528/44, 60, 65, 85

(56) References Cited

U.S. PATENT DOCUMENTS

| | | | |
|---|---|---|---|
| 4,123,413 A | 10/1978 | Mark et al. | 260/32.6 NR |
| 4,482,408 A | 11/1984 | Stephens et al. | 149/19.4 |
| 4,824,888 A | 4/1989 | Emmerling et al. | 524/199 |
| 5,525,654 A | 6/1996 | Podola et al. | 524/199 |
| 5,646,230 A * | 7/1997 | Pantone et al. | |
| 6,218,462 B1 * | 4/2001 | Pantone et al. | |
| 6,355,721 B1 * | 3/2002 | Pantone et al. | |
| 6,384,130 B1 * | 5/2002 | Pantone et al. | |

FOREIGN PATENT DOCUMENTS

EP 1 108 735 6/2001

* cited by examiner

Primary Examiner—Patrick D. Niland
(74) Attorney, Agent, or Firm—Joseph C. Gil; N. Denise Brown

(57) ABSTRACT

This invention relates to novel liquid, polyurethane plasticizers which contain less than 13% by weight, preferably less than 6% by weight of allophanate groups, carbodiimide groups, and/or uretonimine groups, and to a process for the preparation of these liquid polyurethane plasticizers. These comprise the reaction product of at least one organic isocyanate component selected from the group consisting of allophanate modified isocyanates, carbodiimide modified isocyanates, and uretonimine modified isocyanates; with an isocyanate-reactive component which is selected from the group consisting of: (1) one or more isocyanate-reactive compounds having a molecular weight of more than about 1,000, an OH number of about 9 to about 112 and a functionality of about 2 to about 4, and (2) one or more monofunctional alcohols having a molecular weight of about 100 to about 1,000, and an OH number of about 56 to about 560, with the proviso that a stopper comprising a low molecular weight monoalcohol is present when the isocyanate-reactive component only contains (1) one or more isocyanate-reactive compounds having a molecular weight of more than about 1,000, an OH number of about 9 to 112 and a functionality of about 2 to about 4. This invention also relates to a process for the production of a polyurethane comprising reacting a polyisocyanate with an isocyanate-reactive compound in the presence of the liquid, polyurethane plasticizers described herein, and to the resultant polyurethanes containing these plasticizers.

39 Claims, No Drawings

LIQUID POLYURETHANE PLASTICIZERS CONTAINING ALLOPHANATE AND/OR CARBODIIMIDE AND/OR URETONIMINE GROUPS

BACKGROUND OF THE INVENTION

This invention relates to liquid polyurethane plasticizers, to a process for preparing these plasticizers, and to a process for the production of a polyurethane comprising reacting a polyisocyanate component with an isocyanate-reactive component in the presence of these liquid polyurethane plasticizers, and to the polyurethanes produced by this process.

Plasticizers are generally used in plastics (i.e., PVC) to adjust the hardness, flexibility and processing characteristics. Plasticizers are also used in some commercial polyurethane elastomer formulations to provide products exhibiting higher flexibility, lower hardness, and lower rebound resulting in increased energy absorption. However, these products potentially embrittle over time due to migration of the plasticizer. Plasticizers that have a minimal effect on hardness and physical properties, and which are non-migrating are desirable for polyurethane elastomers prepared by a one-shot cast elastomer process.

Diurethanes are known and described as suitable stabilizing additives for sealing compounds in, for example, U.S. Pat. No. 4,824,888 and as plasticizers for polyurethane based sealing and adhesive compositions in U.S. Pat. No. 5,525,654.

U.S. Pat. No. 4,824,888 discloses diurethanes which correspond to one of two general formulas, which are useful as stabilizing additives in sealing compounds based on isocyanate-terminated prepolymers of difunctional and tri-functional polyether or polyester polyols and/or polyvinylchloride swellable copolymers of vinyl chloride with monomers from the group vinyl acetate, vinyl propionate and alkyl acrylates. These diurethanes are prepared by the reaction of diols with monoisocyanates and diurethanes prepared from symmetrical diisocyanates with polyether monoalcohols. In particular, the monoalcohols are monofunctional polypropylene glycol monoalkyl ethers having a molecular weight of about 500 to 2000. These diurethanes are also suitable stabilizing agents for isocyanate-terminated polyurethane prepolymers, and for polyvinyl chloride homopolymer or copolymer plastisols.

Moisture curing sealing and/or adhesive compositions based on alkoxysilane-terminated polyurethanes which contain diurethanes as plasticizers are described by U.S. Pat. No. 5,525,654. These diurethanes are prepared from either diol mixtures and monofunctional isocyanates wherein substantially all the free hydroxyl groups are reacted, or from diisocyanates and monofunctional alcohols wherein substantially all the free isocyanate groups are reacted.

Other urethane plasticizers are disclosed in, for example, U.S. Pat. Nos. 4,123,413 and 4,482,408. The urethane plasticizers of U.S. Pat. No. 4,123,413 correspond to one of three general formulas, and are prepared by reaction of an alcohol or a phenol with an isocyanate, from amines and chloroformates, or from chloroformamides and alcohols or phenols in the presence of acid binding agents.

The urethane plasticizer of U.S. Pat. No. 4,482,408 is octyldecyl-butyl urethane and is prepared by reacting an equimolar mixture of octyldecyl isocyanate and n-butyl alcohol. This urethane plasticizer is a mono-urethane described as a straight-chained, saturated, carbamic acid ester and is suitable as a plasticizer for propellant compositions with problems of plasticizer migration which typically occur during propellant storage.

Applicants' copending U.S. Application Ser. No. 09/453,678 filed Dec. 3, 1999 which is commonly assigned, describes a process for the preparation of one-shot polyurethane cast elastomers containing liquid, diurethane non-migrating plasticizers. The liquid diurethane plasticizers have a viscosity of less than 50,000 mPa.s at 50° C., and are prepared from an asymmetrical diisocyanate containing about 32.0 to 48.3% NCO and a monoalcohol having a molecular weight of about 100 to about 1,000.

High molecular weight, liquid, non-migrating, non-functional polyether polyurethane plasticizers having a viscosity of less than 50,000 mPa.s at 50° C. are described in U.S. Pat. No. 6,355,721, issued Mar. 12, 2002, which is commonly assigned. These plasticizers are prepared by reacting an asymmetrical polyisocyanate and a polyether polyol having a molecular weight of about 1,000 to less than about 5,000 and a functionality of about 2 to about 3, to yield an isocyanate prepolymer having an NCO group content of less than 13%. This isocyanate prepolymer is then reacted with a monofunctional alcohol having a molecular weight of about 32 to about 1,000 at an NCO:OH equivalent ratio of 1:1.

Liquid, hydrophobic, non-migrating, non-functional polyurethane plasticizers having a viscosity of less than about 100,000 mpa.s at 50° C. are described in U.S. Pat. No. 6,384,130, issued May 7, 2002, which is commonly assigned. These plasticizers are prepared in two (2) steps. First, a diisocyanate component having an NCO group content of about 25.0 to about 60.0% and a functionality of about 2.0 is reacted with a hydrophobic polyol having a molecular weight of about 200 to about 4,000 to give an isocyanate prepolymer having an NCO group content of less than 20%, and second, a monofunctional alcohol having a molecular weight of about 32 to about 1,000 is reacted with the isocyanate prepolymer formed in the first step at an NCO:OH equivalent ratio of 1:1.

U.S. Pat. No. 6,218,462, which issued Apr. 17, 2001, which is commonly assigned, describes liquid, ultra-high molecular weight polyurethane plasticizers containing less than 5% of urethane groups. These plasticizers are prepared from the reaction of 1) an aliphatic monoisocyanate and a high molecular weight monoalcohol (molecular weight greater than or equal to 4,000), or 2) a diisocyanate and a high molecular weight monoalcohol as described above, or 3) a diisocyanate and a high molecular weight polyether polyol (molecular weight greater than or equal to 4,000).

Useful polyurethane plasticizers according to the present invention are based on (A) one or more isocyanates selected from the group consisting of allophanate modified isocyanates, carbodiimide modified isocyanates and uretonimine modified isocyanates, with (B) at least one isocyanate-reactive compound selected from the group consisting of (1) one or more isocyanate-reactive compounds having a molecular weight of more than about 1,000, an OH number of about 9 to about 112, and a functionality of from about 2 to about 4, and (2) one or more monofunctional alcohols having a molecular weight of about 100 to about 1,000, and an OH number of about 56 to about 560, and, when (B) comprises (1) as described above, this is followed by the addition of (C) a stopper which comprises a low molecular weight monoalcohol. The plasticizers of the present invention are prepared by either adding (B)(2) the alcohol(s) and/or (B)(1) the polyether polyol(s) to (A) the isocyanate component, or by addition of (A) the isocyanate component to (B)(2) the monofunctional alcohol(s) and/or (B)(1) the polyether polyol(s). The polyurethane plasticizers are liquid at 25° C. The resulting polyurethane plasticizers do not contain any free hydroxyl- or isocyanate-groups, and thus they are non-reactive and can be added to either isocyanates or polyols to form stable mixtures.

Surprisingly, it has been found that plasticizers prepared from a modified polyisocyanate which contains allophanate groups, carbodiimide groups and/or uretonimine groups exhibit reduced migration in a polyurethane elastomer vs. a plasticizer as in Applicants' copending applications described above. In an extraction test, much less of the plasticizers of the present invention can be removed from a polyurethane elastomer than can be removed of Applicants earlier plasticizers in polyurethane elastomers. In addition, the plasticizers of the presently claimed invention result in elastomers exhibiting improved tear strength vs. elastomers containing plasticizers of the prior art and even Applicants' previously described plasticizers.

The use of these polyurethane plasticizers in one-shot elastomers has several important benefits:

1) Addition to either the polyol or the isocyanate composition allows one to adjust the mix ratio very favorably, i.e., to adjust a 1:1.5 ratio to an easier to process ratio of 1:1.
2) Addition to either the polyol or isocyanate composition allows one to adjust the viscosities of the two components very favorably, i.e., to obtain viscosities which are similar which facilitates the mixing process.
3) Unmodified polyisocyanates that contain no urethane, allophanate, urea, or biuret groups are usually very incompatible with polyol compositions due to major differences in surface energy (i.e., polarity). Addition of the polyurethane containing plasticizers which contain allophanate and/or carbodiimide groups in accordance with the present invention to either the polyisocyanate or both the polyisocyanate and polyol side of one-shot elastomer formulations helps to overcome these incompatibility problems and thus facilitates mixing.

Although it is possible in one-shot elastomer formulations to meter the single components separately and mix them, i.e., in a reactor or mixhead, it is preferred to combine the polyurethane plasticizer with the polyisocyanate and/or the polyol/chain extender blend prior to mixing the isocyanate containing the isocyanate reactive polyol components.

Besides the processing advantages polyurethane plasticizers provide in one-shot polyurethane elastomer formulations, they do not exhibit any substantial migration or lower the physical properties of the final polyurethane elastomer upon aging to the extent observed in state of the art non-urethane group containing plasticizers. As a result, the high performance properties of one-shot polyurethane elastomers are effected minorly upon aging when polyurethane containing plasticizers are used in the formulation.

SUMMARY OF THE INVENTION

This invention relates to liquid, polyurethane plasticizers containing less than 13% by weight, Preferably less than 6% by weight of allophanate groups, carbodiimide groups and/ or uretonimine groups. It is preferred that these polyurethane plasticizers have a viscosity of less than about 50,000 mPa·s at 25° C., and more preferably of less than 25,000 mPa·s at 25° C. The liquid, polyurethane plasticizers of the present invention comprise the reaction product of:

(A) at least one organic isocyanate component selected from the group consisting of (1) allophanate modified isocyanates, (2) carbodiimide modified isocyanates, and (3) uretonimine modified isocyanates; and (B) at least one isocyanate-reactive component selected from the group consisting of:
  (1) one or more isocyanate-reactive compounds having a molecular weight of more than about 1,000, preferably more than about 2,000, most preferably of more than about 4,000, an OH number of about 9 to about 112, preferably about 9 to about 56, most preferably of about 9 to about 42, and a functionality of from about 2 to about 4, and preferably about 2 to about 3; and
  (2) one or more monofunctional alcohols having a molecular weight of about 100 to about 1,000, preferably from about 128 to about 720, most preferably of about 300 to about 720, and an OH number of about 56 to about 560, preferably of about 78 to 438 and most preferably of about 78 to about 187;

optionally, followed by the addition of:

(C) a stopper comprising a low molecular weight monoalcohol, wherein (C) is required when only (B)(1) is present as (B); and wherein components (A), (B) and (C) are present in amounts such that the NCO:OH equivalent ratio is about 1:1.

A preferred embodiment of the present invention comprises liquid, polyurethane plasticizers containing less than 13%, preferably less than 6% by weight of allophanate groups, carbodiimide groups and/or uretonimine groups. These plasticizers preferably have a viscosity of less than about 50,000 mPa·s at 25° C., and more preferably of less than 25,000 mPa·s at 25° C. These liquid, polyurethane plasticizers comprise the reaction product of:

(A) at least one organic isocyanate component selected from the group consisting of (1) allophanate modified isocyanates, (2) carbodiimide modified isocyanates and (3) uretonimine modified isocyanates; and (B) at least one isocyanate-reactive component comprising:
  (1) one or more isocyanate-reactive compounds having a molecular weight of more than about 1,000, preferably more than about 2,000, most preferably of more than about 4,000, an OH number of about t9 to about 112, preferably about 9 to about 56, most preferably about 9 to about 42, and a functionality of from about 2 to about 4, preferably about 2 to about 3;

followed by the addition of:

(C) a stopper comprising a low molecular weight monoalcohol;

wherein components (A), (B) and (C) are present in amounts such that the NCO:OH equivalent ratio is about 1:1.

As used herein, the term "polyurethane plasticizer" in the present invention is used to indicate that the plasticizer contains a minimum of one allophanate group, one carbodiimide group, or one uretonimine group per molecule. It may, however, contain 2, 3 or even more allophanate groups, carbodiimide groups or uretonimine groups per molecule, depending on the selection of raw materials and the stoichiometric ratios used.

As used herein, the term "allophanate group" refers to the following structure:

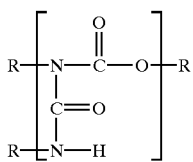

As used herein, the term "uretonimine group" refers to the following structure:

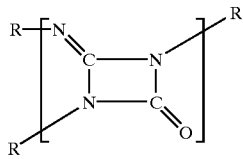

As used herein, the term "carbodiimide group" refers to the following structure:

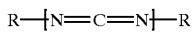

When component (A) the modified isocyanate comprises an allophanate modified isocyanate, the resultant polyurethane plasticizer most preferably has an allophanate content of less than 3% by weight. When (A) the modified isocyanate comprises a carbodiimide and/or a uretonimine modified isocyanate, the resultant polyurethane plasticizer most preferably has an carbodiimide and/or a uretonimine content of less than 2% by weight.

The present invention also relates to a process for the preparation of liquid, polyurethane plasticizers containing less than 13%, preferably less than 6% by weight of allophanate groups, carbodiimide groups and/or uretonimine groups, based on the total weight of the plasticizer. This process comprises (I) reacting
(A) at least one organic isocyanate component selected from the group consisting of (1) allophanate modified isocyanates, (2) carbodiimide modified isocyanates, and (3) uretonimine modified isocyanates; with
(B) at least one isocyanate-reactive component selected from the group consisting of:
(1) one or more isocyanate-reactive compounds having a molecular weight of more than about 1,000, preferably more than about 2,000, most preferably more than about 4,000, an OH number of about 14 to about 112, preferably about 9 to about 56, most preferably of about 9 to about 42, and a functionality of from about 2 to about 4, preferably about 2 to about 3; and
(2) one or more monofunctional alcohols having a molecular weight of about 100 to about 1,000, preferably of about 128 to about 720, most preferably from about 300 to about 720, and an OH number of about 56 to about 560, preferably of about 78 to about 438 and most preferably of about 78 to about 187;
(II) optionally, adding:
(C) a stopper comprising a low molecular weight monoalcohol,
wherein (C) is required when only (B)(1) is present as (B); and wherein components (A), (B) and (C) are present in amounts such that the NCO:OH equivalent ratio is about 1:1.

A preferred embodiment of the present invention relates to a process for the preparation of liquid, polyurethane plasticizers containing less than 13%, preferably less than 6% by weight of allophanate groups, carbodiimide groups and/or uretonimine groups, based on the total weight of the plasticizer. This process comprises (I) reacting
(A) at least one organic isocyanate component selected from the group consisting of (1) allophanate modified isocyanates, (2) carbodiimide modified isocyanates, and (3) uretonimine modified isocyanates; with
(B) at least one isocyanate-reactive component comprising:
(1) one or more isocyanate-reactive compounds having a molecular weight of more than about 1,000, preferably more than about 2,000, most preferably more than about 4,000, an OH number of about 14 to about 112, preferably about 9 to about 56, most preferably of about 9 to about 42, and a functionality of from about 2 to about 4, preferably about 2 to about 3; and
(II) adding
(C) a stopper comprising a low molecular weight monoalcohol;
wherein components (A), (B) and (C) are present in amounts such that the NCO:OH equivalent ratio is about 1:1.

The presently claimed invention is also directed to a process for the production of polyurethanes comprising reacting a polyisocyanate component with an isocyanate-reactive component in the presence of the liquid, polyurethane plasticizers described herein. This invention also relates to the resultant polyurethanes containing these novel plasticizers. The plasticizers of the present invention are non-migrating and the polyurethanes will maintain their elastomer properties over time. The resultant polyurethanes containing the plasticizers of the present invention will also not change elastomer properties upon aging in comparison to polyurethanes which contain conventional plasticizers such as, for example, dioctyl phthlate.

DETAILED DESCRIPTION OF THE INVENTION

In accordance with the present invention, suitable isocyanate components to be used as component (A) in the plasticizers include (1) allophanate modified isocyanates, (2) carbodiimide modified isocyanates, and (3) uretoneimine modified isocyanates, as well as mixtures thereof.

Suitable monomeric diisocyanates may be represented by the formula $R(NCO)_2$ in which R represents an organic group obtained by removing the isocyanate groups from an organic diisocyanate having a molecular weight of about 56 to 1,000, preferably about 84 to 400. Diisocyanates preferred for the process according to the invention are those represented by the above formula in which R represents a divalent aliphatic, hydrocarbon group having 4 to 12 carbon atoms, a divalent cyclo-aliphatic hydrocarbon group having 6 to 13 carbon atoms, a divalent araliphatic hydrocarbon group having 7 to 20 carbon atoms or a divalent aromatic hydrocarbon group having 6 to 18 carbon atoms. Preferred monomeric diisocyanates are those wherein R represents an aromatic hydrocarbon group.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis(4-isocyanatocyclohexyl) methane, 2,4'-dicyclohexylmethane diisocyanate, 1,3- and 1,4-bis(isocyanatomethyl) cyclohexane, bis(4-isocyanato-3-methyl-cyclohexyl) methane, α,α,α',α'-tetramethyl-1,3- and/or -1,4-xylylene diisocyanate, 1-isocyanato-1-methyl-4 (3)-isocyanatomethyl cyclohexane, 2,4- and/or 2,6-hexahydrotoluene diisocyanate, 1,3- and/or 1,4-phenylene diisocyanate, 2,4- and/or 2,6-toluene diisocyanate, 2,4'- and/or 4,4'-diphenylmethane diisocyanate, 1,5-diisocyanato naphthalene and mixtures thereof.

In accordance with the present invention, at least a portion of the polyisocyanate component is present in the form of a polyisocyanate adduct, such as a polyisocyanate adduct containing allophanate groups, a polyisocyanate adduct containing carbodiimide groups, or a polyisocyanate adduct containing uretonimine groups. The polyisocyanate adducts have an average functionality of about 2.0 to about 2.3, and an NCO content of 15 to 32% by weight. Suitable adducts include the following type of components:

Allophanate group-containing polyisocyanates include, for example, those prepared according to the processes disclosed in U.S. Pat. Nos. 3,769,318, 4,160,080, 4,177,342, 4,810,820, 5,319,053, 5,319,054, 5,440,003, 5,606,001, 5,663,272, 5,672,736, 5,859,163, 5,917,083, the disclosures of which are herein incorporated by reference. Preferred allophanate modified polyisocyanates for the present invention have an NCO group content of from about 15 to 32%, and preferably from about 23 to 29%.

Carbodiimide group-containing and uretone imine group-containing polyisocyanates for the present invention include, for example, those which may be prepared by oligomerizing di- or polyisocyanates in the presence of known carbodiimidization catalysts such as described in, for example, German Patentschriften 1,092,007, herein incorporated by reference, U.S. Pat. Nos. 2,853,473, 3,152,162, and 5,202,358, the disclosures of which are herein incorporated by reference, and German Offenlegungschriften 2,504, 400, 2,537,685 and 2,552,350, the disclosures of which are herein incorporated by reference.

It is preferred that the polyisocyanate adducts of the present invention are based on aromatic polyisocyanates. Some examples of suitable aromatic poly-isocyanates are 1,3- and/or 1,4-phenylene diisocyanate, 2,4- and/or 2,6-toluene diisocyanate, 2,4'- and/or 4,4'-diphenylmethane diisocyanate, 1,5-diisocyanato naphthalene and mixtures thereof.

In accordance with the present invention, suitable isocyanate-reactive components to be used as component (B) in the plasticizers of the present invention comprise at least one component selected from the group consisting of:

(1) one or more isocyanate-reactive compounds having a molecular weight of more than about 1,000, preferably more than about 2,000 and most preferably more than about 4,000, having an OH number of about 9 to about 112, preferably about 9 to about 56 and most preferably of about 9 to about 42, and a functionality of from about 2 to about 4, preferably about 2 to about 3; and (2) one or more monofunctional alcohols having a molecular weight of about 100 to about 1,000, preferably from about 128 to about 720 and most preferably of about 300 to about 720, and an OH number of about 56 to about 560, preferably of about 78 to about 438 and most preferably of about 78 to about 187.

Suitable isocyanate-reactive compounds to be used as component (B)(1) herein include, for example, high molecular weight polyether polyols.

The high molecular weight polyethers suitable for use as component (B)(1) in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Examples of suitable alcohols and amines include the low molecular weight chain extenders set forth hereinafter, propylene glycol, glycerin, ethylene glycol, triethanolamine, water, trimethylolpropane, bisphenol A, sucrose, aniline, ammonia, ethanolamine and ethylene diamine.

Polyether polyols are preferably used as component (B) (1) in the invention. Preferred polyethers include, for example, those compounds based on di- or tri-functional starters such as, for example, water, ethylene glycol, propylene glycol, glycerin, trimethylolpropane, or triethanolamine. These preferred compounds include copolymers of ethylene oxide and/or propylene oxide.

Compounds which are suitable to be used as component (B)(2) of the present invention include, for example, the relatively low molecular weight monoalcohols which have a functionality of about 1. Such monoalcohols have molecular weights and OH numbers as described above. Suitable low molecular weight monoalcohols can be obtained by the alkoxylation of alcohols, i.e., reaction of methanol, ethanol, propanol, n-butanol, hexanol, 2-ethyl-hexanol, etc., with ethylene oxide, propylene oxide, butylene oxide, etc., and mixtures thereof.

It is, of course, also possible to use a mixture of (B)(1) and (B)(2) in forming the plasticizers of the present invention.

In the polyurethane plasticizers of the present invention, it may be necessary and/or desirable to add a small amount of (C) a stopper to the reacting mixture of components (A) and (B) to prevent and/or avoid the viscosity of the resultant polyurethane plasticizer from getting too high and no longer remaining a liquid. Suitable stoppers include compounds such as, for example, low molecular weight alcohols with low boiling points and having molecular weights less than about 80, and preferably of about 32 up to about 74, such as, but not limited to, methanol, ethanol, propanol, isopropanol, butanol, and isobutanol. The amount of stopper used is about 1 to about 5% by weight, based on the total weight of components (A) and (B). The stopper is typically added to the reaction mixture after the formation of the ultra-high molecular weight polyurethane plasticizer is almost complete. Then, the reacting mixture is reacted for an additional hour to eliminate all traces of residual isocyanate groups. All unreacted stopper is distilled off under vacuum. Stoppers are not necessary when the isocyanate-reactive component (B) comprises only (B)(2) a monofunctional alcohol as described above, or when (B) comprises a mixture of (B)(1) and (B)(2).

Stoppers are required in the present invention when (B)(1) as described above is used as the sole compound in the isocyanate-reactive component (B). In the plasticizers of the present invention, component (A), the organic isocyanate component, component (B), the isocyanate-reactive component(s), and component (C) when present, are typically present in sufficient amounts such that the NCO:OH equivalent ratio of (A) to (B) and (C) is from about 1:1. A polyisocyanate having a functionality of about 2 to about 2.3 may react with a polyether polyol having a functionality of about 2 to about 4 in amounts such that the NCO:OH equivalent ratio is about 1:1, followed by the addition of a low molecular weight monoalcohol stopper, thereby forming the high molecular weight polyurethane plasticizers of the present invention.

The liquid, polyurethane plasticizers can be prepared by several means. The so-called "standard method" of addition can be used, wherein component (B), the isocyanate-reactive component, is added to component (A), the organic isocyanate component.

Another method of preparing the liquid, polyurethane plasticizers of the present invention is the so-called "reverse-method" of addition wherein component (A), the organic isocyanate component, is added to component (B), the isocyanate-reactive component.

In the process of producing a polyurethane elastomer wherein the reaction between a polyisocyanate component and an isocyanate-reactive component occurs in the presence of the liquid, polyurethane plasticizers described above, suitable polyisocyanates include, for example, monomeric diisocyanates, NCO prepolymers, and preferably liquid polyisocyanates and polyisocyanate adducts. Suitable monomeric diisocyanates may be represented by the formula R(NCO)$_2$ in which R represents an organic group obtained by removing the isocyanate groups from an organic diisocyanate having a molecular weight of about 56 to 1,000, preferably about 84 to 400. Diisocyanates preferred for the process according to the invention are those represented by the above formula in which R represents a divalent aliphatic, hydrocarbon group having 4 to 12 carbon atoms, a divalent cycloaliphatic hydrocarbon group having 6 to 13 carbon atoms, a divalent araliphatic hydrocarbon group having 7 to 20 carbon atoms or a divalent aromatic hydrocarbon group having 6 to 18 carbon atoms. Preferred monomeric diisocyanates are those wherein R represents an aromatic hydrocarbon group.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis(4-isocyanatocyclohexyl) methane, 2,4'-dicyclohexylmethane diisocyanate, 1,3- and 1,4-bis(isocyanatomethyl) cyclohexane, bis(4-isocyanato-3-methyl-cyclohexyl) methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluene diisocyanate, 1,3- and/or 1,4-phenylene diisocyanate, 2,4- and/or 2,6-toluene diisocyanate, 2,4'- and/ or 4,4'-diphenylmethane diisocyanate, 1,5-diisocyanato naphthalene and mixtures thereof. Aromatic polyisocyanates containing more than 2 isocyanate groups such as polymethylene poly(phenylisocyanates) obtained by phosgenating aniline/formaldehyde condensates may also be used.

In accordance with the present invention, at least a portion of the polyisocyanate component may be present in the form of an NCO prepolymer or a polyisocyanate adduct. Suitable polyisocyanate adducts are those containing isocyanurate, uretdione, biuret, urethane, allophanate, carbodiimide and/or oxadiazinetrione groups. The polyisocyanate adducts have an average functionality of 2.0 to 4 and an NCO content of 5 to 30% by weight. Suitable adducts/prepolymers include the following type of components:

1) Isocyanurate group-containing polyisocyanates which may be prepared as set forth in DE-PS 2,616,416, EP-OS 3,765, EP-OS 10,589, EP-OS 47,452, and U.S. Pat. Nos. 4,288,586 and 4,324,879. The isocyanato-isocyanurates generally have an average NCO functionality of 3 to 4.0, preferably of from 3.2 to 3.6, and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a, i.e., trialkyl phosphine catalyst and which may be used in admixture with other aromatic, aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906,126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as tripropylene glycol, trimethylol propane, glycerine, 1,2-dihydroxy propane and mixtures thereof. The urethane group-containing polyisocyanates have a most preferred NCO content of 12 to 25% by weight and an (average) NCO functionality of 2.0 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 29% by weight and an (average) NCO functionality of 2 to 4.

6) Isocyanurate and allophanate group-containing polyisocyanates which may be prepared in accordance with the processes set forth in U.S. Pat. Nos. 5,124,427, 5,208,334 and 5,235,018; the disclosures of which are herein incorporated by reference.

7) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

Preferred polyisocyanate adducts are the polyisocyanates containing urethane groups and allophanate groups.

The NCO prepolymers, which may also be used as the polyisocyanate component in accordance with the present invention, are prepared from the previously described polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 300 to about 5,000, preferably 400 to about 3,000, and optionally low molecular weight compounds with molecular weights below 300. The molecular weights are number average molecular weights ($M_n$) and are determined by end group analysis (OH number). Products obtained by reacting polyisocyanates exclusively with low molecular weight compounds are polyisocyanate adducts containing urethane groups and are not considered to be NCO prepolymers.

It is preferred that the polyisocyanates of the present invention are aromatic polyisocyanates. Some examples of suitable aromatic polyisocyanates are 1,3- and/or 1,4-phenylene diisocyanate, 2,4- and/or 2,6-toluene diisocyanate, 2,4'- and/or 4,4'-diphenylmethane diisocyanate, 1,5-diisocyanato naphthalene and mixtures thereof. Aromatic polyisocyanates containing more than 2 isocyanate groups such as are and polymethylene poly (phenylisocyanates) obtained by phosgenating aniline/formaldehyde condensates may also be used.

"Polymeric MDI" as used herein, refers to polymethylene poly(phenyl-isocyanate) which in addition to monomeric diisocyanate (i.e., two-ring compounds) contains three-ring and higher ring containing products.

Other suitable isocyanates include, for example, cycloaliphatic diisocyanates or prepolymers thereof. Suitable cycloaliphatic diisocyanates include compounds such as, for example, 4,4'-dicyclohexylmethane diisocyanate and isophorone diisocyanate.

Among the polyisocyanates for the presently claimed invention are polymethylene poly(phenylisocyanate) compositions having a functionality of from about 2.1 to about 3.5, preferably 2.2 to 3.2 and most preferably of 2.3 to 2.8, and an NCO group content of about 26% to about 33.4%, preferably about 30.5% to about 33%, and a monomeric diisocyanate content of from about 20% to about 90% by weight, preferably from about 40% to about 80%, wherein the content of monomeric diisocyanate comprises up to about 5% by weight of the 2,2'-isomer, from about 1 to about 25% by weight of the 2,4'-isomer, and from about 25 to about 70% by weight of the 4,4'-isomer, based on the entire weight of the isocyanate composition. The polymeric MDI content of these isocyanates varies from about 10 to about 80% by weight, preferably from about 20% to about 60% by weight.

Also suitable are mixtures of polyisocyanate compositions as described above with adducts of MDI including, for example, allophanates of MDI as described in, for example, U.S. Pat. Nos. 5,319,053, 5,319,054 and 5,440,003, the disclosures of which are herein incorporated by reference; urethanes of MDI as described in, for example, U.S. Pat. Nos. 5,462,766 and 5,558,917, the disclosures of which are herein incorporated by reference; and carbodiimides of MDI as described in, for example, U.S. Pat. Nos. 2,853,473, 2,941,966, 3,152,162, 4,088,665, 4,294,719 and 4,244,855, the disclosures of which are herein incorporated by reference.

Isocyanate prepolymers including, for example, those based on diphenylmethane diisocyanate which may be based on either polyethers or polyesters are suitable for the present invention. These compounds include, for example, an isocyanate-terminated prepolymer having an NCO content of about 4 to about 23%, and a functionality of about 2. Such prepolymers can be prepared by, for example, reacting 2,4'-isomer rich MDI with a difunctional polyether (prepared from propylene glycol and propylene oxide).

Suitable isocyanate-reactive components to be used in the process of producing polyurethanes in the presence of the novel polyurethane plasticizers of the present invention include, for example, compounds containing at least one of the groups selected from the group consisting of hydroxy groups and amine groups, and having an average functionality of from 1 to 4 (preferably from about 2 to about 3) and a molecular weight of about 500 to 12,000, preferably from about 1,000 to 12, 000. Examples of suitable types of compounds to be used include the polyethers, polyesters, polythioethers, polyacetals, polycarbonates, and amine terminated polyethers containing from 1 to 4 isocyanate-reactive groups of the type known for the production of polyurethanes.

The high molecular weight polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Examples of suitable alcohols and amines include the low molecular weight chain extenders set forth hereinafter, propylene glycol, glycerin, ethylene glycol, triethanolamine, water, trimethylolpropane, bisphenol A, sucrose, aniline, ammonia, ethanolamine and ethylene diamine. The polyethers could contain substantial amounts of primary hydroxyl groups in terminal positions (greater than 80% by weight, based on all of the terminal hydroxyl groups present in the polyether).

Polyether polyols are preferably used as the isocyanate-reactive component in the process of producing a polyurethane in the presence of a liquid, polyurethane plasticizer of the present invention. Preferred polyethers include, for example, those compounds based on di- or tri-functional starters such as, for example, water, ethylene glycol, propylene glycol, glycerin, trimethylolpropane, or triethanolamine. These preferred compounds include copolymers of ethylene oxide and/or propylene oxide.

Also suitable are so-called amine terminated polyethers containing primary or secondary (preferably primary) aromatically or aliphatically (preferably aliphatically) bound amino groups, wherein amino end groups can also be attached to the polyether chain through urethane or ester groups. These amine terminated polyethers can be prepared by any of several methods known in the art. For example, amine terminated polyethers can be prepared from polyhydroxyl polyether (e.g., polypropylene glycol ethers) by a reaction with ammonia in the presence of Raney nickel and hydrogen (Belgian Patent No. 634,741). Polyoxyalkylene polyamines can be prepared by reaction of the corresponding polyol with ammonia and hydrogen in the presence of a nickel, copper, chromium catalyst (U.S. Pat. No. 3,654,370). The preparation of polyethers containing amino end groups by the hydrogenation of cyanoethylated polyoxypropylene ethers is described in Germany Patent 1,193,671. Other methods for the preparation of polyoxyalkylene (polyether) amines are described in U.S. Pat. Nos. 3,155,728 and 3,236,895 and in French Patent No. 1,551,605. French Patent No.1,466,708 discloses the preparation of polyethers containing secondary amino end groups. Also useful are the polyether polyamines described in U.S. Pat. Nos. 4,396,729, 4,433,067, 4,444,910 and 4,530,941.

Aminopolyethers obtained by the hydrolysis of compounds containing isocyanate end groups can be employed herein. For example, in a process disclosed in German Offenlegungsschrift 2,948,419, polyethers containing hydroxyl groups (preferably two or three hydroxyl groups) react with polyisocyanate groups are then hydrolyzed in a second step to amino groups. Preferred amine terminated polyethers are prepared by hydrolyzing an isocyanate compound having an isocyanate group content of from 0.5 to 40% by weight. The most preferred polyethers are prepared by first reacting a polyether containing two or four hydroxyl groups with an excess of an aromatic polyisocyanate to form an isocyanate terminated prepolymer and then converting the isocyanate groups to amino groups by hydrolysis. Processes for the production of useful amine terminated polyethers using isocyanate hydrolysis techniques are described in U.S. Pat. Nos. 4,386,218, 4,456,730, 4,472,568, 4,501,873, 4,515,923, 4,525,534, 4,540,720, 4,578,500 and 4,565,645; European Patent 097,299; and German Offenlegungsschrift 2,948,419, all the disclosures of which are herein incorporated by reference. Similar products are also described in U.S. Pat. Nos. 4,506,039, 4,525,590, 4,532,266, 4,532,317, 4,723,032, 4,724,252, 4,855,504 and 4,931,595, the disclosures of which are herein incorporated by reference.

The amine terminated polyethers used in the present invention are in many cases mixtures with any of the above-mentioned compounds.

In another embodiment, the isocyanate-reactive component used to prepare polyurethanes in the presence of the liquid, polyurethane plasticizers of the present invention may additionally comprise: i) a dispersion of a polyurea and/or polyhydrazo-dicarbonamide in a relatively high molecular weight organic compound containing at least two hydroxyl groups, ii) a polymer polyol prepared by polymerizing an ethylenically unsaturated monomer or monomers in a relatively high molecular weight organic compound containing at least two hydroxyl groups, or iii) blends thereof. It is possible to use these types of polyols either alone, or in conjunction with the conventional polyethers described hereinabove.

These types of polyols are known, and can be characterized as hydroxyl containing compounds which contain high molecular weight polyadducts, polycondensates, or polymers in finely dispersed or dissolved form. Such polymers may be obtained by polyaddition reactions (for example, reactions between polyisocyanates and aminofunctional compounds) and polycondensation reactions (for example, between formaldehyde and phenols and/or amines) in situ in the hydroxyl group containing compound. Such processes are described in, for example, German Auslegeschriften 1,168,075 and 1,260,142, the disclosures of which are herein incorporated by reference, and in German Offenlegungsschriften 2,324,134, 2,423,984, 2,512,385, 2,513,815, 2,550,796, 2,550,797, 2,550,833, 2,550,862, 2,633,293, and 2,639,254, the disclosures of which are herein incorporated by reference. See also U.S. Pat. Nos. 3,325,421, 4,042,537, 4,089,835, 4,293,470, 4,296,213, 4,374,209, and 4,786,706, the disclosures of which are herein incorporated by reference. Polyols of this type are commercially available from Bayer Corporation and Bayer AG. Also useful are the so-called polymer polyols obtained by polymerizing one or more ethylenically unsaturated monomers in a hydroxy group containing compound. Polyols modified by vinyl polymers, of the type formed, for example, by polymerizing styrene or acrylonitrile in the presence of polyether polyol are also suitable, as are polybutadienes containing OH groups. Such polymer polyols are described in U.S. Pat. Nos. 3,383,351, 3,304,273, 3,523,093, 3,110,685, and RE 28,715 and 29,118, and German Patent 1,152,536, the disclosures of which are herein incorporated by reference. Polymer polyols are commercially available from Bayer AG, BASF, and Union Carbide.

The preferred PHD polyols include, for example, the polyurea of toluene diisocyanate and hydrazine dispersed in polyether polyol, and the preferred polymer polyols include, for example, those based on the monomers styrene and acrylonitrile.

Suitable examples of high molecular weight polyesters include, for example, the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above-identified U.S. patents. Finally, representatives of the many and varied compounds which may be used in accordance with the invention may be found, for example, in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71. Polyesters are less preferred.

In addition, the isocyanate-reactive component generally also comprises at least one crosslinking agent and/or at least one chain extender compound which contains isocyanate-reactive groups. These are typically used in addition to the relatively high molecular weight component as described above. Suitable crosslinking agents and/or chain extenders may contain hydroxyl groups, amine groups, or both. These compounds have relatively low molecular weights of, for example, from about 60 to less than about 500, and contain from 1 to 4, preferably from 2 to 3 isocyanate-reactive groups.

Suitable chain extenders and/or crosslinking agents according to the invention include, for example, diols and triols such as, for example, 2-methyl-1,3-propanediol, ethylene glycol, 1,2- and 1,3-propanediol, 1,3-and 1,4- and 2,3-butane-diol, 1,6-hexane-diol, 1,10-decanediol, diethylene glycol, triethylene glycol, tetraethylene glycol, dipropylene glycol, tripropylene glycol, neopentyl glycol, cyclohexane-dimethanol, 2,2,4-trimethylpentane-1,3- diol, trimethylol propane, 1,4-ethoxy(β-hydroxybenzene), and mixtures thereof. Preferred diols include, for example, 1,4-butanediol, ethylene glycol, diethylene glycol, trimethylol propane, 1,4-ethoxy(β-hydroxybenzene), and mixtures thereof.

Suitable aminoalcohols to be used as crosslinking agents include, for example, monoisopropanolamine, monoethanolamine, etc.

Suitable amine compounds to be used as crosslinking agents in accordance with the invention include organic primary amines and secondary amines such as, for example, 2-methyl-1,5-pentane diamine, ethylene diamine, 1,3-diamino-propane, 1,3-diaminobutane, 1,4-diaminobutane, isophorone-diamine, diamino-cyclohexane, hexamethylene-diamine, methyliminobis-(propylamine), bis(aminopropyl) piperazine, aminoethyl piperazine, bis-(p-aminocyclohexyl)-methane, mixtures thereof, and the like.

Other suitable amines include, for example, 1,8-p-diamino-methane, bis(4-amino-3-methylcyclohexyl) methane, bis(4-amino-3,5-dimethylcyclohexyl)methane, bis (4-amino-2,3,5-trimethylcyclohexyl)-methane, 1,1-bis(4-aminocyclohexyl)propane, 2,2-(bis(4-aminocyclohexyl)

propane, 1,1-bis(4-aminocyclohexyl)ethane, 1,1-bis(4-aminocyclohexyl)butane, 2,2-bis(4-aminocyclohexyl)butane, 1,1-bis(4-amino-3-methylcyclohexyl)ethane, 2,2-bis(4-amino-3-methylcyclohexyl)propane, 1,1-bis(4-amino-3,5-dimethylcyclohexyl)ethane, 2,2-bis(4-amino-3,5-dimethylcyclohexyl)propane, 2,2-bis(4-amino-3,5-dimethylcyclohexyl)-butane, 2,4-diaminodicyclohexylmethane, 4-aminocyclohexyl-4-amino-3-methylcyclohexylmethane, 4-amino-3,5-dimethylcyclohexyl-4-amino-3-methylcyclohexylmethane, and 2-(4-aminocyclohexyl)-2-(4-amino-3-methylcyclohexyl)methane.

It is also possible to use the so-called amine-terminated polyethers having low molecular weights. Among the suitable amine terminated polyethers include, for example, those containing primary or secondary, aromatically or aliphatically bound amino groups, wherein amino end groups can also be attached to the polyether chain through urethane or ester groups. Suitable compounds include, for example, Jeffamine D-400 and Jeffamine D-230, which are commercially available from Huntsman Chemical Corporation.

These low molecular weight amine-terminated polyethers can be prepared by any of several methods known in the art. For example, amine-terminated polyethers can be prepared from polyhydroxyl polyether (e.g., polypropylene glycol ethers) by a reaction with ammonia in the presence of Raney nickel and hydrogen (Belgian Patent No. 634,741). Polyoxyalkylene polyamines can be prepared by reaction of the corresponding polyol with ammonia and hydrogen in the presence of a nickel, copper, or chromium catalyst (U.S. Pat. No. 3,654,370). The preparation of polyethers containing amino end groups by the hydrogenation of cyanoethylated Polyoxypropylene ethers is described in Germany Patent 1,193,671. Other methods for the preparation of polyoxyalkylene (polyether) amines are described in U.S. Pat. Nos. 3,155,728 and 3,236,895 and in French Patent No. 1,551,605. French Patent No. 1,466,708 discloses the preparation of polyethers containing secondary amine end groups. Also useful are the polyether polyamines described in U.S. Pat. Nos. 4,396,729, 4,433,067, 4,444,910 and 4,530,941.

Aminopolyethers obtained by the hydrolysis of compounds containing isocyanate end groups can also be employed herein. For example, in a process disclosed in German Offenlegungsschrift 2,948,419, polyethers containing hydroxyl groups (preferably two or three hydroxyl groups) react with polyisocyanate groups are then hydrolyzed in a second step to amino groups. The preferred polyethers are prepared by first reacting a polyether containing two or four hydroxyl groups with an excess of an aromatic polyisocyanate to form an isocyanate terminated prepolymer and then converting the isocyanate groups to amino groups by hydrolysis.

Processes for the production of useful amine terminated polyethers using isocyanate hydrolysis techniques are described in U.S. Pat. Nos. 4,386,218, 4,456,730, 4,472,568, 4,501,873, 4,515,923, 4,525,534, 4,540,720, 4,578,500 and 4,565,645; European Patent 097,299; and German Offenlegungsschrift 2,948,419, all the disclosures of which are herein incorporated by reference. Similar products are also described in U.S. Pat. Nos. 4,506,039, 4,525,590, 4,532,266, 4,532,317, 4,723,032, 4,724,252, 4,855,504 and 4,931,595, the disclosures of which are herein incorporated by reference.

The amine terminated polyethers used in the present invention are in many cases mixtures with any of the above-mentioned compounds.

Other suitable amines to be used for the crosslinking agent in the present invention include, for example, aromatic diamines such as, for example, 1-methyl-3,5-diethyl-2,4-diamino benzene (i.e., DETDA), 1-methyl-3,5-diethyl-2,6-diamino benzene (i.e., DETDA), 1,3,5-trimethyl-2,4-diamino benzene, 1,3,5-triethyl-2,4-diamino benzene, 3,5,3',5'-tetraethyl-4,4'-diamino diphenylmethane, 3,5,3',5'-tetraisopropyl-4,4'-diamino diphenylmethane, 3,5-diethyl-3',5'-diisopropyl-4,4'-diamino diphenyl-methane, 3,3'-diethyl-5,5'-diisopropyl-4,4'-diamino diphenyl-methane, 1-methyl-2,6-diamino-3-isopropylbenzene, 1-methyl-3,5-dithioethyl-2,4-diamino benzene and/or 1-methyl-3,5-dithioethyl-2,6 diamino benzene (ETHACURE 300), and mixtures of the above diamines, such as, for example, mixtures of 1-methyl-3,5-diethyl-2,4-diamino benzene and 1-methyl-3,5-diethyl-2,6-diamino benzene.

Preferred compounds containing amine groups to be used in the present invention as crosslinking agents include monoethanolamine, DETDA, and ETHACURE 300.

It is also possible that the low-molecular weight crosslinking agents include at least one organic crosslinker such as, for example, organic polyols and/or organic amines containing greater than 2 isocyanate-reactive groups, preferably 3 to 8 isocyanate-reactive groups, and most preferably 3 isocyanate-reactive groups. Examples of such compounds include, for example, diethanolamine, triethanolamine, trimethylolpropane, glycerol, diisopropanolamine, mixtures thereof, and the like. Alkoxylated polyols of the above mentioned starter compounds are also suitable crosslinkers.

In the process of producing a polyurethane elastomer comprising reacting an polyisocyanate component, with an isocyanate-reactive component which comprises a relatively high molecular weight component and/or a crosslinking agent/chain extending component, in the presence of the liquid polyurethane plasticizers of the present invention, the resultant polyurethane contains from 5 to 90%, preferably from 10 to 50%, by weight, based on the total weight of the polyurethane product of the liquid polyurethane plasticizer. The NCO:OH ratio of the polyisocyanate component to the sum of isocyanate-reactive atoms in the isocyanate-reactive component is from 0.90:1 to 1.10:1, preferably from 1.01:1 to 1.05:1.

The process for the production of the polyurethane elastomers of the present invention comprises reacting three (3) separate streams of a polyisocyanate component, an -reactive component, and the novel polyurethane plasticizer of this invention.

In an alternate embodiment, for example, wherein the relatively high molecular weight component and the crosslinking agent/chain extender component are two separate streams or components instead of being one component, this process allows for the reaction of four (4) separate streams of components to form the resultant polyurethane elastomer product.

It is preferred that the liquid polyurethane plasticizer of the present invention is premixed with (1) the polyisocyanate component, or (2) the isocyanate-reactive component comprising a relatively high molecular weight compound and/or a crosslinking agent/chain extending compound, or various combinations thereof, in the process scheme described above.

The resultant polyurethane elastomer produced by reacting a polyisocyanate component with an isocyanate-reactive component in the presence of the novel plasticizers are characterized by its ability to maintain the original properties of the elastomer over an extended period of time because the plasticizer will not migrate out of the elastomer. These polyurethane elastomers also exhibit no change in elastomeric properties upon aging in comparison to polyurethane elastomers containing conventional plasticizers such as, for example, dioctyl phthalate.

A comparison of polyurethane elastomers containing the plasticizers of the present invention vs. the plasticizers of Applicants' copending applications reveals a further decrease in the migration of the presently claimed plasticizers from the polyurethane elastomer. It also illustrates that polyurethane elastomers containing the presently claimed plasticizers exhibit improved tear strength.

As used herein, the term "liquid" with respect to the liquid polyurethane plasticizers means a material that flows freely after storage for 2 days at 25° C.

The following examples further illustrate details for the preparation and use of the compounds of this invention. The invention, which is set forth in the foregoing disclosure, is not to be limited either in spirit or scope by these examples. Those skilled in the art will readily understand that known variations of the conditions and processes of the following preparative procedures can be used to prepare these compounds. Unless otherwise noted, all temperatures are degrees Celsius and all parts and percentages are parts by weight and percentages by weight, respectively.

EXAMPLES

The following compounds were used in the preparation of liquid, polyurethane plasticizers containing allophanate groups, carbodiimide groups and/or uretonimine groups as working examples for the present invention.

Isocyanate A: an allophanate-modified 4,4'-diphenylmethane diisocyanate (MDI) isocyanate having an NCO group content of about 29%, an equivalent weight of about 145, and a functionality of about 2. Isocyanate A contained about 4.4% by weight of allophanate groups.

Isocyanate B: an allophanate-modified 4,4'-diphenylmethane diisocyanate (MDI) isocyanate having an NCO group content of about 27%, an equivalent weight of about 156, and a functionality of about 2. Isocyanate B contained about 6.2% by weight of allophanate groups.

Isocyanate C: an allophanate-modified 4,4'-diphenylmethane diisocyanate (MDI) isocyanate and having an NCO group content of about 26%, an equivalent weight of about 161, and a functionality of about 2. Isocyanate C contained about 7.1% by weight of allophanate groups.

Isocyanate D: a uretone imine-modified 4,4'-diphenylmethane diisocyanate (MDI) isocyanate having an NCO group content of about 29.5%, an equivalent weight of about 143 and a functionality of about 2.2. Isocyanate D contained about 2.7% by weight of uretonimine groups.

Polyol A: a propoxylated/ethoxylated (PO:EO wt. ratio=80:20) propylene glycol initiated polyether polyol having a functionality of about 2, an molecular weight of about 4,000, and an OH number of about 28

Polyol B: a propoxylated propylene glycol initiated polyether polyol having a functionality of about 2, a molecular weight of about 4,000 and an OH number of about 28

Polyol C: a propoxylated/ethoxylated (PO:EO wt. ratio=87:13) glycerine initiated polyether polyol having a functionality of about 3, a molecular weight of about 6,000 and an OH number of about 28

Polyol D: a propoxylated propylene glycol initiated polyether polyol having a functionality of about 2, a molecular weight of about 8,000 and an OH number of about 14

Monoalcohol A: a 12 mole ethoxylate of a mixture of $C_{12}$–$C_{15}$ linear primary alcohols, having an OH number of 78, a molecular weight of 719, a water content of 0.01% and an EO:OH weight ratio of 11.7:1, and which is a solid Monoalcohol B: a 3 mole ethoxylate of a mixture of $C_{12}$–$C_{13}$ linear primary alcohols, having an OH number of 177, a molecular weight of 317, a water content of 0.01% and an EO:OH weight ratio of 2.8:1, and which is a liquid Stopper A: 2-propanol Catalyst A: dibutyltin dilaurate The preparation of Polyurethane Plasticizers Liquid, polyurethane plasticizers were prepared using either the so-called "reverse-method" of addition or the "standard-method" of addition. In the reverse-method of addition, (A) the isocyanate component was added to (B) the isocyanate-reactive component in a reactor equipped with heating/cooling, an agitator, a thermocouple, and a nitrogen blanket. This method was used in Examples 1–4 and 6 of Table 1A below. In the standard-method of addition, (B) the isocyanate-reactive component was added to (A) the isocyanate component, with the application of cooling as necessary. This method was used in Example 5 of Table 1A below. The results of Examples 1–6 are shown in Table 1A below.

In accordance with the reverse-method of addition, the isocyanate (at 50° C.) was added to the monoalcohol (at 50° C.) at such a rate that the reaction temperature did not exceed 80° C. Cooling was applied as needed. Then, the reaction mixture was heated to 80° C. and maintained at that temperature for 3 to 5 hours, until the mixture was free of isocyanate as determined by isocyanate indicator paper. The isocyanate indicator paper used was Isocyanate Detection Paper commercially available from MDI Scientific, 405 Barclay Blvd, Lincolnshire, Ill. 60069.

In the standard-method (as used in Example 5), the monoalcohol component (at 50° C.) was added to the isocyanate component (at 50° C.) at such a rate that the reaction temperature did not exceed 80° C. Cooling was applied as needed. Then, the reaction mixture was heated to 80° C. and maintained at that temperature for 3 to 5 hours, until the mixture was free of isocyanate as determined by isocyanate indicator paper. The isocyanate indicator paper used was Isocyanate Detection Paper commercially available from MDI Scientific, 405 Barclay Blvd, Lincolnshire, Ill. 60069.

The polyurethane plasticizers illustrated in Examples 11–14 in Table 1C below were prepared from an isocyanate component and a polyether polyol component using the reverse-method of addition. After reaction for 4 hours at 80° C., the mixture was cooled to 70° C. A trace amount of isocyanate component was unreacted after testing positive with the isocyanate indicator paper.

A drop of Catalyst A was added to Examples 11 and 13 and reaction continued at 70° C. After a short time, the reaction mixture became a solid.

In Examples 12 and 14, after reaction at 80° C. for 4 hours, the mixture was cooled to 70° C. Then, 3% of Stopper A (i.e. 2-propanol), was added and reacted for an additional 1 hour at 70° C. Then, a drop of Catalyst A was added and the mixture reacted an additional 0.5 hour, until all of the isocyanate was reacted as determined by using isocyanate indicator paper. At this time, the excess unreacted 2-propanol was distilled off at 70° C. under full vacuum.

The polyurethane plasticizers shown in Examples 7–10 in Table 1B, were prepared using a two-step process using the standard method of addition in a reactor equipped with a stirrer and a thermocouple to read reaction temperatures. The reaction was conducted under a dry nitrogen blanket.

In the first step, the isocyanate component was charged to the reactor and heated under agitation to 50° C.

Subsequently, the polyether polyol, which was heated to 50 to 80° C., was added. Next, the material was heated to 80° C. and that temperature was maintained for 3–5 hours. The % NCO of the resultant isocyanate-terminated polyether prepolymer was determined.

In the second-step, the isocyanate-terminated polyether prepolymer from Table 1B was then cooled to about 50° C. The amount of monoalcohol (also shown in Table 1B) necessary to completely react with the isocyanate-terminated polyether prepolymer (NCO:OH=1:1) was determined for each example. This amount of monoalcohol, which was preheated to 50° C., was added to the isocyanate-terminated polyether prepolymer as quickly as possible while maintaining the temperature between 50 and 80° C. Cooling was applied to the flask as needed. Then, the reaction mixture was heated to 80° C. and maintained at that temperature for about 3 to 5 hours, until all the isocyanate was reacted. This was determined by using isocyanate indicated paper as described above.

The Preparation of Polyurethane Elastomers Containing the Polyurethane Plasticizers of the Invention The following components were used in the preparation of polyurethane elastomers:

| | |
|---|---|
| Polyol C: | as described above |
| Diol A: | 1,4-butanediol |
| Catalyst A: | as described above (dibutyltin dilaurate) |
| Isocyanate E: | a modified diphenylmethane diisocyanate terminated polyether prepolymer based on polypropylene ethylene glycol ether (OH number = 28) having an NCO group content of about 21.7% |

The polyurethane elastomers in Table 2 were prepared using a hand cast procedure. The formulation for these elastomers was as follows:

| | |
|---|---|
| Polyol C: | 172.7 parts by weight |
| Diol A: | 19.2 parts by weight |
| Plasticizer: | 74.0 parts by weight |
| Catalyst A: | 5–10 ppm |
| Isocyanate E: | 104.1 parts by weight |

The weight of the catalyst (dibutyltin dilaurate) in the formulation was based on the total weight of the polyol, the diol, and the plasticizer in the formulation.

The polyol, the diol, the plasticizer, and the catalyst were weighed into a suitable vessel and then degassed in a vacuum heating oven at 25–50° C. until free of bubbles. Then, the isocyanate (pre-degassed) was added to the vessel and stirred for 30–60 seconds. The reaction mixture was then poured into a steel mold. The elastomer was removed from the mold in ca. 15 minutes to 4 hours and placed in a 80° C. oven for 16 hours. After the elastomer was stored at 25° C. for 5 days, the elastomer properties were determined. The elastomer properties are shown in Table 3 below.

The degree of migration of the polyurethane plasticizers described in the present invention, and of the non-urethane plasticizer, diocyl phthlate, in a polyurethane elastomer formulation were determined and are shown in Table 4 below. An extraction method was used as an accelerated test on the plasticizer containing polyurethane elastomers to determine the migration rate. A 4"×1"×⅛" section of the polyurethane elastomer was weighed and placed in a tube of a Soxlet extractor. The elastomer was extracted with refluxing xylene for 1 hour. The sample was left overnight at room temperature and then placed in a vacuum dissicator for 3 hours at 80° C. to remove any excess xylene. The dried sample was reweighted and the percent loss of the plasticizer was determined.

The term non-migrating plasticizer as used herein is defined as a plasticizer which loses less than 50% by weight, based on the total weight of the plasticizer, in a polyurethane elastomer under the extraction method conditions as described hereinabove.

TABLE 1A

Liquid Polyurethane Plasticizers

| | Example 1 | Example 2 | Example 3 | Example 4 | Example 5 | Example 6 |
|---|---|---|---|---|---|---|
| Isocyanate | B | C | B | D | D | D |
| Polyol | — | — | — | — | — | — |
| Alcohol | A | A | B | A | A | B |
| Stopper | — | — | — | — | — | — |
| NCO:OH ratio | 1:1 | 1:1 | 1:1 | 1:1 | 1:1 | 1:1 |
| Apearance at 25° C. | Liquid | Liquid | Liquid | Liquid | Liquid | Liquid |
| Viscosity (mPa · s at 25° C.) | 2,377 | 2,470 | 19,980 | 2,555 | 3,489 | 19,750 |
| % Isocyanate | 17.78 | 18.40 | 32.92 | 16.59 | 16.59 | 31.09 |
| % Polyol | 0.0 | 0.0 | 0.0 | 0.0 | 0.0 | 0.0 |
| % Alcohol | 82.22 | 81.60 | 67.08 | 83.41 | 83.41 | 68.91 |
| % Stopper | 0.0 | 0.0 | 0.0 | 0.0 | 0.0 | 0.0 |
| Type of Addition | Reverse | Reverse | Reverse | Reverse | Standard | Reverse |
| % Allophanate Carbodiimide and/or Uretonimine Groups | 1.1* | 1.3 | 2.0 | 0.5 | 0.5 | 0.8 |

$$*\% \text{ Allophanate Groups} = \left[\frac{\% \text{ Allophanate in Isocyanate B}}{100}\right] \times$$

$$[\% \text{ Isocyanate B}] = \left[\frac{6.2}{100}\right] \times [17.78\%] = 1.1\%$$

TABLE 1B

Liquid Polyurethane Plasticizers

| | Example 7 | Example 8 | Example 9 | Example 10 |
|---|---|---|---|---|
| Isocyanate | A | A | D | D |
| Polyol | A | B | C | D |
| Alcohol | A | A | A | B |
| Stopper | — | — | — | — |
| NCO:OH ratio | 1:1 | 1:1 | 1:1 | 1:1 |
| Apearance at 25° C. | Liquid | Liquid | Liquid | Liquid |
| Visc. (mPa · s @ 25° C.) | 1,177 | 1,225 | 4,200 | 22,610 |
| % Isocyanate | 15.99 | 15.99 | 15.88 | 28.40 |
| % Polyol | 7.52 | 7.52 | 5.30 | 9.47 |
| % Alcohol | 76.49 | 76.49 | 78.82 | 62.13 |
| % Stopper | 0.0 | 0.0 | 0.0 | 0.0 |
| Type of Addition | Standard | Standard | Standard | Standard |
| % Allophanate, Carbodiimide and/or Uretonimine Groups | 0.7 | 0.7 | 0.3 | 0.8 |

TABLE 1C

Liquid Polyurethane Plasticizers

| | Example 11 | Example 12 | Example 13 | Example 14 |
|---|---|---|---|---|
| Isocyanate | C | C | D | D |
| Polyol | D | D | D | D |
| Alcohol | — | — | — | — |
| Stopper A | no | yes | no | yes |
| NCO:OH ratio | 1:1 | 1:1 | 1:1 | 1:1 |
| Apearance at 25° C. | Solid | Liquid | Solid | Liquid |
| Visc. (mPa · s @ 25° C.) | — | 11,320 | — | 10,560 |
| % Iso | 3.90 | 3.90 | 3.45 | 3.45 |
| % Polyol | 96.10 | 96.10 | 96.55 | 96.55 |
| % Alcohol | 0.0 | 0.0 | 0.0 | 0.0 |
| % Stopper A | — | 3.0 | — | 3.0 |
| Type of Addition | Reverse | Reverse | Reverse | Reverse |
| % Allophanate Carbodiimide and/or Uretonimine Groups | 0.3 | 0.3 | 0.1 | 0.1 |

TABLE 2

Polyurethane Elastomers Containing Polyurethane Plasticizers

| Example | Plasticizer, Table 1A–1C | Isocyanate, Table 1A–1C | Polyol, Table 1A–1C | Monoalcohol, Table 1A–1C | Stopper, Table 1A–1C | Processing Temp., ° C. | Catalyst, ppm | Pot Life, Minutes |
|---|---|---|---|---|---|---|---|---|
| Example 15 | Dioctyl Phthalate | none | none | none | none | 25 | 5 | 10'00" |
| Example 16 | Example 2 | C | none | A | none | 25 | 10 | 1'40" |
| Example 17 | Example 8 | A | B | A | none | 25 | 10 | 1'50" |
| Example 18 | Example 12 | C | D | none | A | 25 | 5 | 4'00" |

TABLE 3

Elastomer Properties

| Example (from Table 2) | Hardness (Shore A) | Tensile Strength (psi) | Elongation (%) | Elongation Set (%) | Tear Die C (pli) | Bayshore Rebound (%) |
|---|---|---|---|---|---|---|
| Example 15 | 62 | 1,200 | 340 | 10 | 70 | 60 |
| Example 16 | 52 | 800 | 280 | 7 | 157 | 43 |
| Example 17 | 54 | 900 | 350 | 15 | 165 | 48 |
| Example 18 | 62 | 1,200 | 340 | 10 | 120 | 55 |

TABLE 4

Plasticizer Migration Properties (as determined by xylene extraction)

| Example (Table 2) | Plasticizer, Table 1A–1C | Isocyanate, Table 1A–1C | Polyol, Table 1A–1C | Monoalcohol, Table 1A–1C | Stopper, Table 1A–1C | Plasticizer Migration (% loss by wt.)* |
|---|---|---|---|---|---|---|
| Example 15 | Dioctyl Phthalate | none | none | none | none | 70% |
| Example 16 | Example 2 | C | none | A | none | 3% |
| Example 17 | Example 8 | A | B | A | none | 2% |
| Example 18 | Example 12 | C | D | none | A | <1% |

*based on the total weight of the plasticizers

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A liquid, polyurethane plasticizer containing less than 13% by weight of allophanate, carbodiimide and/or uretonimine groups, and comprising the reaction product of:
   (A) at least one organic isocyanate component selected from the group consisting of allophanate modified isocyanates, carbodiimide modified isocyanates and uretonimine modified isocyanates, with
   (B) at least one isocyanate-reactive component selected from the group consisting of:
      (1) one or more isocyanate-reactive compounds having a molecular weight of more than about 1,000, and an OH number of about 9 to about 112, and a functionality of from about 2 to about 4; and
      (2) one or more monofunctional alcohols having a molecular weight of about 100 to about 1,000, an OH number of about 56 to about 560;
   optionally, followed by the addition of:
   (C) a stopper comprising a low molecular weight monoalcohol, with the proviso that (C) is present when (B)(1) is used as the sole isocyanate-reactive component;

wherein components (A), (B) and (C) are present in amounts such that the NCO:OH equivalent ratio is about 1:1.

2. The liquid, polyurethane plasticizer of claim 1, comprising the reaction product of:

(A) at least one organic isocyanate component selected from the group consisting of allophanate modified isocyanates, carbodiimide modified isocyanates and uretonimine modified isocyanates, with (B) at least one isocyanate-reactive component comprising:
(1) one or more isocyanate-reactive compounds having a molecular weight of more than about 1,000, and an OH number of about 9 to about 112, and a functionality of from about 2 to about 4;

followed by the addition of:

(C) a stopper comprising a low molecular weight monoalcohol;

wherein components (A), (B) and (C) are present in amounts such that the NCO:OH equivalent ratio is about 1:1.

3. The plasticizer of claim 1 which contains less than 6% by weight of allophanate, carbodiimide and/or uretonimine groups.

4. The plasticizer of claim 1, wherein the allophanate group content is less than 3% by weight.

5. The plasticizer of claim 1, wherein the carbodiimide group and/or uretonimine group content is less than 2% by weight.

6. The plasticizer of claim 1 which is characterized by a viscosity of less than about 50,000 mPa·s at 25° C.

7. The plasticizer of claim 6 which is characterized by a viscosity of less than about 25,000 mPa·s at 25° C.

8. The plasticizer of claim 1, wherein (A) said organic isocyanate component comprises an allophanate modified isocyanate having an NCO group content of from 15% to 32%.

9. The plasticizer of claim 8, wherein said allophanate modified isocyanate has an NCO group content of from about 23% to about 29%.

10. The plasticizer of claim 1, wherein (B) said isocyanate-reactive component comprises (1) one or more isocyanate-reactive compounds having a molecular weight of more than about 2,000 and an OH number of about 9 to about 56 and a functionality of about 2 to about 3.

11. The plasticizer of claim 10, wherein (B)(1) said one or more isocyanate-reactive compounds has a molecular weight of more than about 4,000, an OH number of about 9 to about 42, and a functionality of about 2 to about 3.

12. The plasticizer of claim 1, wherein (A) said isocyanate component has a functionality of about 2.0 to about 2.3.

13. The plasticizer of claim 2, wherein (A) said isocyanate component has a functionality of about 2.0 to about 2.3.

14. The plasticizer of claim 1, wherein (B) said isocyanate-reactive component comprises (2) one or more monofunctional alcohols having a molecular weight of about 128 to about 720 and an OH number of about 78 to about 438.

15. The plasticizer of claim 14, wherein (B)(2) said one or more monofunctional alcohols has a molecular weight of about 300 to about 720 and an OH number of about 78 to about 187.

16. The plasticizer of claim 1, wherein (C) said stopper is added in an amount of about 3% or less, based on the combined weight of components (A) and (B).

17. A process for the preparation of a liquid polyurethane plasticizer containing less than 13% by weight of allophanate groups, carbodimide groups, and/or uretonimine groups, which comprises (I) reacting:
(A) at least one organic isocyanate component selected from the group consisting of allophanate modified isocyanates, carbodiimide modified isocyanates, and uretonimine modified isocyanates, with (B) at least one isocyanate-reactive component selected from the group consisting of:
(1) one or more isocyanate-reactive compounds having a molecular weight of more than about 1,000, an OH number of about 9 to about 112, and a functionality of from about 2 to about 4; and
(2) one or more monofunctional alcohols having a molecular weight of about 100 to about 1,000, and an OH number of about 56 to about 560;

and optionally, (II) adding:
(C) a stopper comprising a low molecular weight monoalcohol, with the proviso that (C) is present when (B)(1) is used as the sole isocyanate-reactive component;

wherein components (A), (B) and (C) are present in amounts such that the NCO:OH equivalent ratio is about 1:1.

18. The process of claim 17, which comprises
(I) reacting:
(A) at least one organic isocyanate component selected from the group consisting of allophanate modified isocyanates, carbodiimide modified isocyanates, and uretonimine modified isocyanates, with (B) at least one isocyanate-reactive components comprising:
(1) one or more isocyanate-reactive compounds having a molecular weight of more than about 1,000, an OH number of about 9 to about 112, and a functionality of from about 2 to about 4; and (II) adding:
(C) a stopper comprising a low molecular weight monoalcohol;

wherein components (A), (B) and (C) are present in amounts such that the NCO:OH equivalent ratio is about 1:1.

19. The process of claim 17, wherein the plasticizer contains less than 6% by weight of allophanate groups, carbodiimide groups and/or uretonimine groups.

20. The process of claim 17, wherein the allophanate group content of the plasticizer is less than 3% by weight.

21. The process of claim 17, wherein the carbodiimide group and/or uretonimine group content of the plasticizer is less than 2% by weight.

22. The process of claim 17, wherein the plasticizer is characterized by a viscosity of less than about 50,000 mPa·s at 25° C.

23. The process of claim 22, wherein the plasticizer is characterized by a viscosity of less than about 25,000 mPa·s at 25° C.

24. The process of claim 17, wherein (A) said organic isocyanate component comprises an allophanate modified isocyanate having an NCO group content of from 15% to 32%.

25. The process of claim 24, wherein said allophanate modified isocyanate has an NCO group content of from about 23% to about 29%.

26. The process of claim 17, wherein (B) said isocyanate-reactive component comprises (1) one or more isocyanate-reactive compounds having a molecular weight of more than about 2,000, an OH number of about 9 to about 56 and a functionality of about 2 to about 3.

27. The process of claim 26, wherein (B)(1) said one or more isocyanate-reactive compounds has a molecular weight of more than about 4,000, an OH number of about 9 to about 42, and a functionality of about 2 to about 3.

28. The process of claim 17, wherein (B) said isocyanate-reactive component comprises (2) one or more monofunctional alcohols having a molecular weight of about 128 to about 720 and an OH number of about 78 to about 438.

29. The process of claim 28, wherein (B)(2) said one or more monofunctional alcohols has a molecular weight of about 300 to about 720 and an OH number of about 78 to about 187.

30. The process of claim 17, wherein (C) said stopper is added in an amount of about 3% by weight or less, based on the combined weight of components (A) and (B).

31. The process of claim 17, wherein (A) said isocyanate has a functionality of about 2.0 to about 2.3.

32. The process of claim 18, wherein (A) said isocyanate has a functionality of about 2.0 to about 2.3.

33. A process for the production of a polyurethane elastomer comprising reacting (i) a polyisocyanate component, with (ii) an isocyanate-reactive component, in the presence of (iii) the liquid polyurethane plasticizer of claim 1.

34. The process of claim 33, wherein (ii) said isocyanate-reactive component comprises (a) one or more relatively high molecular weight polyols, and/or (b) one or more relatively low molecular weight chain extenders.

35. The process of claim 34, wherein (ii) (a) said relatively high molecular weight polyols have a functionality of from about 1 to about 4 and a molecular weight of about 500 to about 12,000; and (ii)(b) said relatively low molecular weight chain extenders have a functionality of about 1 to about 4 and a molecular weight of about 60 to less than about 500.

36. The process of claim 34, wherein (ii)(a) said relatively high molecular weight polyols have a functionality of from about 2 to about 3 and a molecular weight of about 1,000 to about 12,000.

37. The process of claim 34, wherein (ii)(a) said high molecular weight polyols are selected from the group consisting of polyether polyols and polyester polyols.

38. The polyurethane elastomers produced by the process of claim 33.

39. The polyurethane elastomers produced by the process of claim 33, wherein (iii) said plasticizer is present in an amount of less than 50% by weight, based on the total weight of the polyurethane elastomer.

* * * * *